United States Patent
Quendt et al.

(10) Patent No.: US 12,508,100 B2
(45) Date of Patent: Dec. 30, 2025

(54) METHOD FOR OPERATING A MEDICAL OPTICAL TRACKING SYSTEM, AND MEDICAL OPTICAL TRACKING SYSTEM

(71) Applicants: CARL ZEISS MEDITEC AG, Jena (DE); BRAINLAB SE, Munich (DE)

(72) Inventors: Dieter Quendt, Essingen (DE); Dominik Litsch, Schorndorf (DE); Richard Bäumer, Urbach (DE); Johannes Manus, Munich (DE)

(73) Assignee: BRAINLAB SE, Munich (DE)

( * ) Notice: Subject to any disclaimer, the term of this patent is extended or adjusted under 35 U.S.C. 154(b) by 36 days.

(21) Appl. No.: 18/545,175

(22) Filed: Dec. 19, 2023

(65) Prior Publication Data
US 2024/0197435 A1 Jun. 20, 2024

(30) Foreign Application Priority Data
Dec. 19, 2022 (DE) ...................... 10 2022 213 906.2

(51) Int. Cl.
*A61B 90/00* (2016.01)

(52) U.S. Cl.
CPC ...... *A61B 90/39* (2016.02); *A61B 2090/3945* (2016.02); *A61B 2090/3983* (2016.02)

(58) Field of Classification Search
CPC .. A61B 2034/2055; A61B 2017/00154; A61B 2090/0818; A61B 2090/3945; A61B 2090/3983; A61B 34/20; A61B 90/39
See application file for complete search history.

(56) References Cited

U.S. PATENT DOCUMENTS

2007/0013783 A1* 1/2007 Goldbach .............. A61B 90/36
348/208.1

FOREIGN PATENT DOCUMENTS

EP 1733693 A1 12/2006
WO 2014067000 A1 5/2014

OTHER PUBLICATIONS

Wermke et al., "Optical Synchronization Optical Synchronization of Multiple Time-of-Flight Cameras Implementing TDMA," 2020 IEEE Sensors, DOI: 10.1109/SENSORS47125.2020.9278667 (5 pages).

* cited by examiner

*Primary Examiner* — Amelie R Davis
(74) *Attorney, Agent, or Firm* — NIXON PEABODY LLP; Jeffrey L. Costellia

(57) ABSTRACT

A method and a medical optical tracking system, wherein the medical optical tracking system is synchronized with at least one other medical optical tracking system, extraneous light signals of the at least one other optical tracking system are detected by way of a sensor or a camera used for tracking of the optical tracking system, temporal properties of the detected extraneous light signals are determined based on acquired sensor data or acquired camera images, and temporal properties of light signals generated by way of a light source of the optical tracking system and/or a measuring window of the sensor or the camera are defined, on the basis of the determined temporal properties of the extraneous light signals, such that the light signals from the light source and/or the measuring window lie in light signal pauses of the at least one other optical tracking system.

12 Claims, 2 Drawing Sheets

METHOD FOR OPERATING A MEDICAL OPTICAL TRACKING SYSTEM, AND MEDICAL OPTICAL TRACKING SYSTEM

CROSS-REFERENCE TO RELATED APPLICATIONS

The present application claims priority under 35 U.S.C. § 119 to German Patent Application No. 10 2022 213 906.2, filed Dec. 19, 2022, the contents of which are incorporated by reference herein in their entirety.

The invention relates to a method for operating a medical optical tracking system, and to a medical optical tracking system.

Various light sources are found in the surgical environment, some of which emit light in pulsed mode and/or at predefined wavelengths. The light sources are for example light sources for normal illumination in the operating room or light sources that are necessary to expose cameras or other photosensors. One field of application for the use of light pulses is that of optical tracking systems (also referred to as navigation systems) that enable the detection of devices, tools and/or the patient in the surgical environment based on markers. Such optical tracking systems often operate outside the visible light spectrum, so as not to be impaired by visible light. In order to achieve high light intensities that are needed in order to be able to be detected using the sensors/cameras, the optical tracking systems are often operated in pulsed mode. Since the non-visible wavelength range, which is however able to be detected by the sensors/cameras due to commonly used detector materials, is relatively narrow, many systems often pulse in this case in the same wavelength range. Optical tracking systems often operate in a wavelength range of around 830 to 940 nm. A pulse frequency is usually determined by a refresh rate of a (line) camera that is used and is not able be changed, or is able to be changed only to a small extent. This may therefore result in mutual interference in one or more optical tracking systems.

WO 2014/067 000 A1 describes systems and methods for optical topology recognition and illumination. Examples provide an integrated system and methods for the operation thereof, wherein the integrated system comprises an illumination system and a detection system for optical topologies, and wherein at least a portion of the spectral content of illumination light from the illumination system is within an optical detection bandwidth of the detection system for optical topologies, and wherein the operation of the detection system for optical topologies and of the illumination system are nested in order to avoid crosstalk, such that the detection system for optical topologies detects the detection light for optical topologies when the illumination system does not emit any illumination light. The system may contain an optical navigation system and control the operation thereof.

The components of the system may be mounted on a rigid frame in order to maintain calibration.

Felix Wermke et al., *Optical Synchronization of Multiple Time-of-Flight Cameras Implementing TDMA*, 2020 IEEE Sensors, doi: 10.1109/SENSORS47125.202020.9278667, discloses a method for synchronizing multiple time-of-flight cameras.

The invention is based on the object of providing a method for operating a medical optical tracking system and a medical optical tracking system, in both of which synchronization with at least one other medical optical tracking system is improved.

The object is achieved according to the invention by a method having the features of Patent claim 1 and a medical optical tracking system having the features of Patent claim 12. Advantageous embodiments of the invention will become apparent from the dependent claims.

One of the basic concepts of the invention is that of synchronizing the medical optical tracking system with the at least one other medical optical tracking system without additional sensors. This is based on the concept that synchronization has to take place only if the other optical tracking system leads to impairment of a sensor or a camera of the optical tracking system as a result of the emission of (extraneous) light signals. An impairment that necessitates synchronization may only be present at all if the extraneous light signals are detected by the sensor or the camera of the optical tracking system. Instead of an additional sensor for detecting the extraneous light signals and for the synchronization, the sensor that is already present or the camera that is already present of the medical optical tracking system may thus be used for the synchronization. To this end, provision is made for extraneous light signals of the at least one other medical optical tracking system to be detected by way of the sensor or by way of the camera of the medical optical tracking system for the synchronization. As a rule, such an extraneous light signal comprises a pulse sequence consisting of light pulses. Temporal properties of the detected extraneous light signals are determined based on the acquired sensor data or the acquired camera images. In the example of the pulse sequence, the temporal properties comprise for example a time at which a pulse sequence begins, a pulse width and a repetition rate (frequency) of the extraneous light pulses. Based on the determined temporal properties, temporal properties of light signals, in particular light pulses, of the medical optical tracking system, along with, as an alternative or in addition, temporal properties in relation to the detection of these light signals by way of the sensor or the camera, that is to say a measuring window of the sensor or of the camera, are then defined. This takes place such that the light signals from the light source and/or the detection or the measuring window are arranged temporally in light signal pauses, in particular in pulse pauses in the extraneous light signals, of the at least one other tracking system. This makes it possible to reduce or even completely avoid mutual interference between the tracking systems. Overall, the method and the medical optical tracking system make it possible to improve simultaneous operation of multiple medical optical tracking systems in an at least overlapping wavelength range.

Provision is thus made in particular for a method for operating a medical optical tracking system, wherein the medical optical tracking system is synchronized with at least one other medical optical tracking system, wherein, to this end, extraneous light signals of the at least one other optical tracking system are detected by way of a sensor used for tracking or a camera used for tracking of the optical tracking system, temporal properties of the detected extraneous light signals are determined based on acquired sensor data or acquired camera images, and temporal properties of light signals generated by way of a light source of the optical tracking system and/or a measuring window of the sensor or the camera are defined, on the basis of the determined temporal properties of the extraneous light signals, such that the light signals from the light source and/or the measuring window lie in light signal pauses of the at least one other optical tracking system.

Provision is furthermore made in particular for a medical optical tracking system comprising a sensor or a camera, wherein the sensor or the camera are used for optical tracking, a light source configured to provide light signals for the optical tracking, and a control device, wherein the control device is configured to perform synchronization with at least one other medical optical tracking system and, to this end, to obtain sensor data acquired by way of the sensor or camera images acquired by way of the camera, which comprise detected extraneous light signals of the at least one other optical tracking system, to determine temporal properties of the detected extraneous light signals based on the obtained sensor data or the obtained camera images, and to define temporal properties of the light signals generated by way of the light source and/or a measuring window of the sensor or the camera, on the basis of the determined temporal properties of the extraneous light signals, such that the light signals from the light source and/or the measuring window lie in light signal pauses of the at least one other optical tracking system.

One advantage of the method and of the medical optical tracking system is that synchronization is able to be performed without additional effort or additional devices, such as for example an additional photosensor or additional wiring for wired synchronization. Synchronization may in principle be performed here with multiple other medical optical tracking systems.

By way of the method and the medical optical tracking system, it is possible in particular to define, in particular to change, both temporal properties of the generated light signals of the tracking system and, as an alternative or in addition, temporal properties of the measuring window of the sensor or the camera on the basis of the temporal properties of the extraneous light signals.

Considering two medical optical tracking systems (hereinafter referred to as tracking system and other tracking system) by way of example, it is possible to distinguish between three possible cases in particular:

In the first case, the other tracking system is subject to interference by light signals of the tracking system. In order to prevent the interference, the method described in this disclosure makes it possible to arrange the light signals of the tracking system outside a measuring window of the other tracking system. Since the measuring window is not readily known or able to be determined, the light signals of the tracking system are arranged in light signal pauses of the other tracking system. In order to take into account a measuring window that is larger than the extraneous light signal, an (additional) delay time in relation to the extraneous light signal may in particular be taken into account here. As a result, the tracking system then generates light signals that lie outside the measuring window of the other tracking system.

In the second case, the tracking system is subject to interference by light signals of the other tracking system, but, conversely, no interference is present. In order to prevent the interference, the method described in this disclosure makes it possible to arrange the measuring window of the tracking system outside the extraneous light signals of the other tracking system. To this end, the measuring window of the tracking system is arranged in light signal pauses of the other tracking system. Furthermore, the light signals of the tracking system are also arranged in the measuring window thereby defined, and thus likewise in the light signal pauses of the other tracking system. As a result, the tracking system then performs detection in a measuring window that lies temporally outside the extraneous light signals of the other tracking system.

In a third case, there is mutual interference between the tracking systems. In order to prevent the mutual interference, the method described in this disclosure makes it possible to temporally arrange the light signals and the measuring window of the tracking system such that the light signals lie outside the measuring window of the other tracking system (for the procedure, see first case) and the measuring window lies in a light signal pause of the extraneous light signal of the other tracking system (for the procedure, see second case).

A medical optical tracking system basically operates in a manner known per se. It is possible in particular, by way of the light signal, to excite a target object (target) and/or optical markers to reflect and/or remit, these being detected by way of the sensor or the camera. Specially designed geometric markers may be used for example to determine a pose or an absolute position, that is to say a position and an orientation, of the markers in an in particular three-dimensional coordinate system. If the marker or the target is arranged on a surgical instrument, on a patient or on a device, the marker pose or target pose or the marker absolute position or target absolute position and a known relationship between the marker or the target and the instrument, the patient or the device may be used to infer the respective pose or absolute position thereof. A camera may in particular also be a stereo camera. However, a camera may also be an environment camera that is arranged for example on a surgical microscope or another medical visualization system. A detection duration during tracking (which may also be referred to as exposure time), which is defined by the measuring window, may be controlled for example by way of a control loop, wherein the control variable of the control loop here is a signal strength or brightness of the target object or of the optical marker in the acquired sensor data or the acquired camera images. The medical optical tracking system may for example be a microscope-internal tracking system of a surgical microscope. The at least one other medical tracking system may for example be a medical navigation system.

Within the scope of this disclosure, the term tracking is intended in particular to include the meaning of following or keeping track and/or determining, in particular repeatedly or continuously, the position and/or orientation of an object (for example a marker) in an in particular three-dimensional coordinate system. The sensor or the camera may in principle however also be used to recognize the presence of objects or to create a topography. These applications are in particular intended to be covered by the term tracking as well.

The light source of the medical optical tracking system may comprise for example one or more light-emitting diodes that emit in a predefined wavelength range (in particular in the non-visible, for example in the near-infrared or infrared, for example in a range of 830 to 860 nm). By way of example, an illumination duration may be in the range of a few milliseconds, for example in the range of 2 to 5 milliseconds.

The sensor or the camera acquire sensor data, respectively camera images, in each case in a measuring window of a predefined duration (for example a few milliseconds) with a measurement frequency or repetition rate, which is in particular in a range of 20 to 120 Hz. The light signal and an associated measuring window are coordinated with one another. The measuring window is in particular larger here than the illumination duration of the light signal. The measuring window in particular temporally surrounds or contains the light signal completely.

It will in particular be assumed in this disclosure that the medical optical tracking systems basically operate freely and/or independently of one another, that is to say, apart from the method described in this disclosure, there is no other synchronization whatsoever between the medical optical tracking systems. Each of the medical optical tracking systems in particular uses its own time base and/or in particular has its own clock.

The extraneous light signals and the light signals are in particular in the form of pulses. Use is made in particular of regularly repeating, in particular identical pulses that are generated, alternately with a pulse pause as a pulse sequence, by the light sources. The extraneous light signals and light signals may however, in principle, alternatively also contain other signal forms.

A measuring window refers in particular to the period during which sensor data or camera images are acquired for the tracking (that is to say for the tracking function) and/or during which acquired sensor data or camera images are taken into account for the tracking. The measuring window is thus in particular independent of the detection of the extraneous light signals performed as part of the synchronization. The sensor data or camera images may in principle be acquired in particular continuously (or continuously with a discrete repetition rate), that is to say in particular including outside the measuring window, but these are then not taken into account for the tracking. It is possible in particular for sensor data or camera images for the synchronization to be acquired and taken into account continuously (or continuously with a discrete repetition rate), in particular when determining the temporal properties of the extraneous light signals.

When detecting the extraneous light signals, provision is made in particular for a period of the detection (and/or an exposure time) to be selected to be as large as possible, so that a probability of detecting extraneous light signals is as high as possible. Depending on the application scenario, provision may be made in particular for values of up to a few milliseconds at repetition frequencies of the extraneous light signals between 20 and 120 Hz.

Light signal pauses are in particular time periods during which no (extraneous) light signals whatsoever are detected and/or expected from another medical optical tracking system.

Parts of the medical optical tracking system, in particular the control device, may be designed, either individually or together, as a combination of hardware and software, for example as program code that is executed on a microcontroller or microprocessor. However, provision may also be made for parts to be designed, either individually or together, as application-specific integrated circuits (ASICs) and/or field-programmable gate arrays (FPGAs).

To define the temporal properties of the light signals from the light source of the medical optical tracking system and/or the measuring window in which detection is performed by way of the sensor or the camera for the tracking, it is possible for example to determine pulse pauses in a pulse sequence or in a pulse pattern of another medical optical tracking system. The light signals, in particular light pulses, of the medical optical tracking system are then arranged for example in each case temporally in the middle between two extraneous light pulses of the other tracking system. The associated measuring window is in particular selected accordingly. The light signal, in particular the light pulses, and/or the associated measuring window may however in principle also be arranged at another point in time in the pulse pause between two extraneous light pulses. In the case of multiple other medical optical tracking systems, the light signal, in particular the light pulse, and/or the measuring window are accordingly arranged in light signal pauses (in particular in an intersection of the light signal pauses) of the other tracking systems.

In one embodiment, provision is made for the temporal properties of the generated light signals and/or the measuring window to be defined such that the light signals and/or the measuring window are arranged in the light signal pauses a respectively predefined delay time after the respective extraneous light signals. This makes it possible in particular to be able to arrange the light signal of the medical optical tracking system outside a measuring window of another medical optical tracking system, such that impairment of the other medical optical tracking system is able to be avoided. Provision may be made for example for the light signal, in particular a light pulse, and/or the measuring window of the medical optical tracking system to be arranged after a (respectively) defined delay time behind a falling edge of the extraneous light signal, in particular behind the falling edge of the extraneous light pulse, of the other medical optical tracking system.

In one embodiment, provision is made for the synchronization to be repeated after a predefined duration has elapsed. This makes it possible to perform and thus update the synchronization at a later time. This is advantageous since the time bases of the tracking systems are otherwise not synchronized with one another. Provision may for example be made to perform synchronization again after a predefined duration has elapsed. To this end, the control device may for example monitor the elapsing of a timer.

In one embodiment, provision is made for the synchronization to be repeated at regular intervals. This makes it possible to keep the medical optical tracking system continuously synchronized with the at least one other medical optical tracking system. Provision may for example be made to perform synchronization over and over again after a predefined duration has elapsed. By way of example, the synchronization may be performed regularly every 10 seconds. If the temporal properties (for example a pulse width, a repetition frequency and/or a phase position of extraneous light pulses) of the at least one other medical optical tracking system are known and constant over relatively long periods, then the synchronization generally has to be repeated less frequently.

Provision may be made, in one embodiment, for the synchronization to be performed at a time at which an extraneous light signal is expected. This is possible in particular if temporal properties (for example a pulse width, a repetition frequency and/or a phase position of extraneous light pulses) of the at least one other medical optical tracking system are known. At the expected time, for example, detection is performed with only a short detection time and a check is performed to determine whether or not the expected extraneous light signal is detected within this detection time. If this is not the case, the temporal properties of the light signals and of the measuring window are defined again through a resynchronization. Otherwise, the temporal properties of the light signals and of the measuring window are retained.

In one embodiment, provision is made, in order to determine the temporal properties of the extraneous light signals, for a signal form and/or a frequency and/or a phase position and/or a start time and/or a duration of the extraneous light signals of the other optical tracking system to be determined. This makes it possible in particular to reliably determine the signal pauses of the at least one other medical optical tracking system and thus the periods in which the light signals from the light source and the measuring window of the sensor or the camera of the medical optical tracking system may be arranged. When determining the abovementioned signal parameters, it is possible in particular to use methods that are known per se, such as a Fourier transformation/analysis (in particular a fast Fourier transform) and/or pattern recognition and/or artificial intelligence methods (for example machine learning methods, such as trained deep neural networks).

In one embodiment, provision is made for the light source to be deactivated during the synchronization, at least during the detection of the extraneous light signals. This makes it possible to avoid interference caused by the light source of the medical optical tracking system when detecting the extraneous light signals. By way of example, provision may be made for the control device to deactivate the light source and then trigger the synchronization. After the synchronization, the control device then reactivates the light source. The deactivation may be carried out for example by switching off. As an alternative, the deactivation may also be carried out by suitably stopping down the light.

During activation, the light source is then accordingly switched back on or a stop is removed from the light path.

In one embodiment, provision is made for a measuring frequency of the sensor or the camera to be selected to be greater during the synchronization than in a tracking mode. This makes it possible to improve a temporal resolution during the detection of the extraneous light signals, such that even extraneous light signals with a short duration are able to be detected and evaluated. In optical tracking systems, the repetition rates/frequencies used for the light pulses are generally in the range of 20 to 120 Hz. The control device then in particular triggers an increase in the measuring frequency for the synchronization. After the synchronization, the measuring frequency is then reduced again.

In one embodiment, provision is made for a first synchronization to be performed prior to activation of the light source. This makes it possible to operate the medical optical tracking system in synchronicity with the at least one other medical optical tracking system from the outset.

In one embodiment, provision is made for a signal and/or a message to be generated and output if no extraneous light signals were detected during the detection and/or synchronization is not possible. This allows a user to be informed that there is no interference with another optical tracking system or synchronization is not possible. By way of example, the signal may be an acoustic or visual signal. The message may be output for example on a display device and/or contain information that no extraneous light signals were detected and/or synchronization is not possible.

In one embodiment, provision is made for the light source to be deactivated when synchronization is not possible. This makes it possible in particular to prevent impairment of other medical optical tracking systems in the environment. In particular, the deactivation takes place if it is determined, during the synchronization, that there is not a (long enough) signal pause able to be used for the light pulses. This may occur for example when another medical optical tracking system is currently carrying out high-accuracy patient registration, in which a pulse and acquisition frequency is significantly increased compared to a normal tracking mode. It may then be the case that the remaining (extraneous) light signal pauses are too small here determine and use this.

In one embodiment, provision is made for sensor data acquired by way of the sensor or camera images acquired by way of the camera in tracking mode to be evaluated, wherein artefacts and/or errors and/or interference signals caused by extraneous light signals of the other optical tracking system are recognized, and wherein the synchronization is initiated when artefacts and/or errors and/or interference signals have been recognized. This makes it possible to determine, during ongoing (tracking) mode, whether there is any impairment caused by another medical optical tracking system. Artefacts and/or errors and/or interference signals may be recognized for example with the aid of computer vision and/or artificial intelligence methods (for example machine learning). By way of example, flicker effects, that is to say a periodic fluctuation of the average image brightness in a sequence of camera images (video), may indicate such an impairment.

Further features regarding the design of the medical optical tracking system will become apparent from the description of embodiments of the method. The advantages of the medical optical tracking system here are each the same as in the embodiments of the method.

The invention is explained in more detail below with reference to the figures using preferred exemplary embodiments. In the figures.

Figure 1:
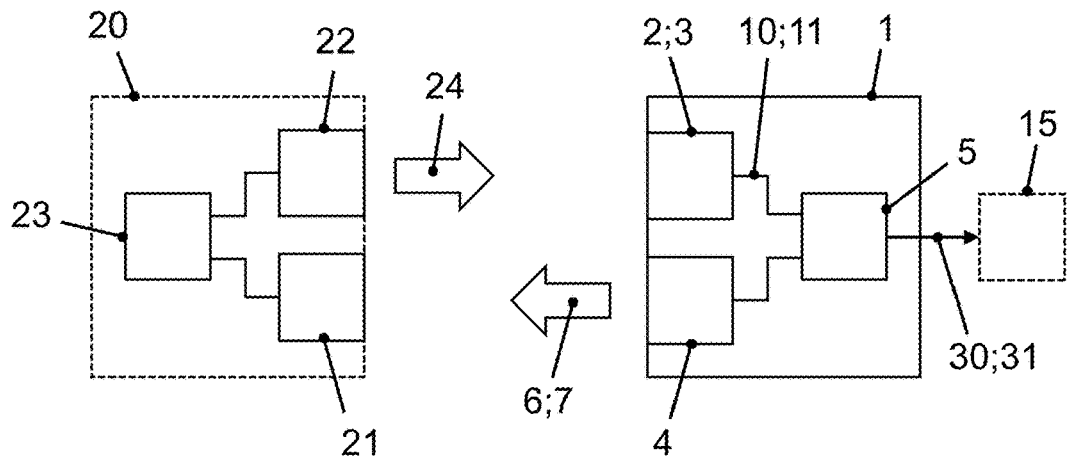
FIG. 1 shows a schematic illustration of one embodiment of the medical optical tracking system.

FIG. 1 shows a schematic illustration of one embodiment of the medical optical tracking system 1. The medical optical tracking system 1 comprises a sensor 2 or a camera 3, a light source 4 and a control device 5. The medical optical tracking system 1 in particular performs the method described in this disclosure.

The sensor 2 or the camera 3 is configured to detect light 6 emitted by the light source 4 and reflected or remitted in an environment within a detection range of the sensor 2 or the camera 3 from objects and/or features and/or markers such that it is possible to determine a position and orientation of objects, features and/or markers in the environment based on acquired sensor data 10 or acquired camera images 11. To this end, the light source 4 emits in particular light signals 6 in the form of successive light pulses 7 at regular intervals. A repetition rate or frequency of the light pulses 7 is in particular here in a range between 20 and 120 Hz.

The control device 5 is configured to control the light source 4 and to determine the position and orientation based on the acquired sensor data 10 or acquired camera images 11. This tracking takes place in particular in a manner known per se. The light source 4 and the sensor 2 or the camera 3 operate in particular in a non-visible wavelength range of light, in particular in the infrared wavelength range.

The control device 5 is furthermore configured to perform synchronization with at least one other medical optical tracking system 20. FIG. 1 shows, by way of example, another medical optical tracking system 20 that is designed basically like the tracking system 1, that is to say the other tracking system 20 comprises a camera 21, for example a stereo camera, a light source 22 and a control device 23. The light source 22 emits extraneous light signals 24, in particular in the form of a pulse sequence.

For the synchronization, the sensor data 10 acquired by way of the sensor 2 or the camera images 11 acquired by way of the camera 3, which comprise and/or represent the extraneous light signals 24 of the other optical tracking system 20, are obtained by the control device 5. The sensor data 10 or camera images 11 in particular contain a temporal profile of the extraneous light signals 24 and/or represent same. The control device 5 determines temporal properties of the detected extraneous light signals 24 based on the obtained sensor data 10 or the obtained camera images 11 and defines temporal properties of the light signals 6 generated by way of the light source 4 and/or a temporal measuring window of the sensor 2 or the camera 3 on the basis of the determined temporal properties of the extraneous light signals 24 such that the light signals 6 from the light source 4, in particular the light pulses 7, and/or the measuring window lie in light signal pauses of the other optical tracking system 20.

Figure 2:
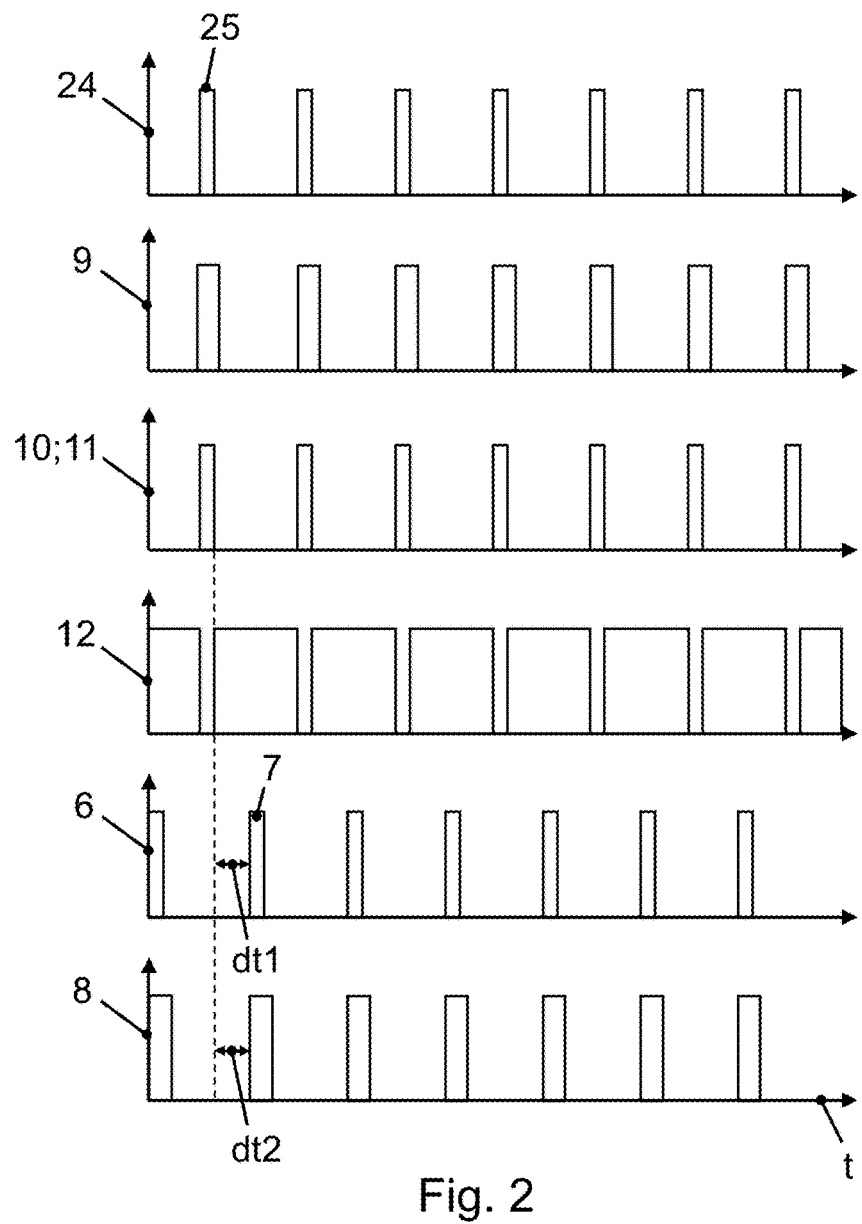
FIG. 2 shows a schematic illustration for elucidating the synchronization.

FIG. 2 shows a schematic illustration for elucidating the synchronization. The following are each shown over time against time t: Extraneous light signals 24 and measuring windows 9 of another medical optical tracking system, acquired sensor data 10 or a signal derived from the camera images 11, light signal pauses 12 derived from the sensor data 10 or the camera images 11, and the light signals 6 from the light source and the measuring windows 8 of the medical optical tracking system.

The extraneous light signals 24 comprise a regular sequence of extraneous light pulses 25 (only one of these is provided with a reference sign for the sake of clarity). This sequence of extraneous light pulses 25 is detected by way of the sensor or the camera, and is therefore included in the sensor data 10 or the camera images 11. A highly simplified illustration has been selected here for the camera images 11 for the sake of clarity, but the acquired camera images 11 are in particular evaluated in order to extract the information contained therein regarding the detected extraneous light pulses 25 through suitable image evaluation. By way of example, to this end, a periodic brightness fluctuation caused by the extraneous light pulses 25 may be evaluated at least in regions or image elements.

Based on the acquired sensor data 10 or the acquired camera images 11, the control device determines temporal properties of the extraneous light signals 24.

Provision may be made here, in order to determine the temporal properties of the extraneous light signals 24, for a signal form and/or a frequency and/or a phase position and/or a start time and/or a duration/pulse width of the extraneous light signals 24 of the other optical tracking system 20 to be determined. By way of example, a Fourier transformation/analysis may be performed in order to determine frequency components of the extraneous light signals 24 represented in the sensor data 10 or camera images 11.

Based thereon, the control device determines signal pauses 12 between the extraneous light signals 24, in particular between the extraneous light pulses 25. This is carried out by way of methods that are known per se, such as for example comparing the sensor data 10 or the camera data 11 with predefined threshold values or suitable shifting and inversion of the extraneous light signals 24, in particular the extraneous light pulses 25.

In order to avoid impairment of the medical optical tracking system by the other medical optical tracking system and/or impairment of the other medical optical tracking system by the medical tracking system, the light signals 6 and/or the measuring window 8 are arranged temporally in the determined extraneous light signal pauses 12. In the example shown, this is achieved by arranging the light signals 6 and/or the measuring window 8 in each case in the middle of the signal pauses 12, that is to say the light signals 6 and/or measuring windows 8 are then arranged temporally in the middle between the extraneous light signals 24, in particular the extraneous light pulses 25. The light signals 6 in particular have the form of light pulses 7 (only one of these is provided with a reference sign for the sake of clarity). The control device 5 (FIG. 1) transmits corresponding control signals and/or control parameters to the light source 4 (FIG. 1). In the example shown, the measuring window 8 is in each case slightly longer than the respectively associated light pulse 7. The control device 5 also transmits corresponding control signals and/or control parameters to the sensor 2 (FIG. 1) or the camera 3. The light signals 6 then lie temporally outside the measuring windows 9 of the other tracking system.

As an alternative, provision may also be made for the temporal properties of the generated light signals 6 and/or the measuring window 8 to be defined such that the light signals 6 and/or the measuring window 8 are arranged in the light signal pauses 12 a respectively predefined delay time dt1, dt2 after the respective extraneous light signals 24. By way of example, provision may be made for a temporal position of the light signals 6 and the measuring window 8 in the extraneous signal pauses 12 to be selected based on a predefined delay time dt1, dt2 after a falling edge of the extraneous light signals 24, which may be determined based on the acquired sensor data 10 or camera data 11 (as schematically indicated). The predefined delay times dt1, dt2 may be expressed both in the form of absolute values (expressed for example by indicating milliseconds, etc.) and in relation to a period of the extraneous light signals 24 or in relation to the extraneous signal pause 12 (for example after ¼ of the extraneous signal pause has elapsed). This makes it possible to select a temporal position of the light signals 6 in particular taking into account a measuring window 9 of the other medical optical tracking system. Since the measuring window 9 is generally larger than the extraneous light signal 24 or the extraneous light pulse 25, it is thereby possible to prevent the light signal 6 of the medical optical tracking system lying temporally in the measuring window 9 of the other medical optical tracking system. By way of example, the delay times dt1, dt2 may be increased incrementally until the other medical optical tracking system is no longer impaired.

Provision may be made for the synchronization to be repeated after a predefined duration has elapsed. By way of example, provision may be made for the synchronization to be repeated after 10 seconds, after 30 seconds or after 60 seconds. After this duration has elapsed, this being checked for example by a timer, the synchronization is performed again.

Provision may furthermore be made for the synchronization to be repeated at regular intervals. By way of example, elapsing of the abovementioned duration may be checked repeatedly and the synchronization may be restarted after each elapsing. The synchronization may in principle also be carried out continuously, for example by virtue of the sensor or the camera performing acquisition with an (in particular maximum) measuring frequency (for example with an image acquisition rate of 60 Hz) and continuously determining the temporal properties of the extraneous light signals 24.

Provision may be made for illumination by way of the light source 4 to be deactivated during the synchronization, at least during the detection of the extraneous light signals 24. To this end, the control device 5 deactivates the light source 4 during the synchronization. After the synchronization, the control device 5 reactivates the light source 4. The deactivation may be carried out for example by switching off the light source 4 or by suitably stopping down the light source 4 by way of a stop or a filter or another suitable optical element.

Provision may be made for a measuring frequency of the sensor 2 or the camera 3 to be selected to be greater during the synchronization than in a tracking mode. To this end, the control device 5 transmits corresponding control signals and/or control parameters to the sensor 2 or the camera 3. After the synchronization, the measuring frequency is then reset in particular to the value for the tracking by transmitting corresponding control signals and/or control parameters.

Provision may be made for a first synchronization to be performed prior to activation of the light source 4. Provision may be made in particular to keep the light source 4 deactivated during commissioning of the medical optical tracking device until synchronization has been performed. The control device 5 activates the light source 4 only when the synchronization has been run through and the temporal properties of the light signals 6 and the measuring window 8 have been defined.

Provision may be made for a signal 30 and/or a message 31 to be generated and output if no extraneous light signals 24 were detected during the detection and/or synchronization is not possible. The signal 30 and/or the message 31 may be output for example on a display device 15.

Provision may be made for the light source 4 to be deactivated if synchronization is not possible. To this end, the control device 5 transmits a corresponding control signal and/or a control parameter to the light source 4. The deactivation may be carried out for example by switching off the light source 4 or by suitably stopping down the light source 4 by way of a stop or a filter or another suitable optical element.

Provision may be made for sensor data 10 acquired by way of the sensor 2 or camera images 11 acquired by way of the camera 3 in tracking mode to be evaluated, wherein artefacts and/or errors and/or interference signals caused by extraneous light signals 24 of the other optical tracking system 20 are recognized, and wherein the synchronization is initiated when artefacts and/or errors and/or interference signals have been recognized. To this end, the control device 5 evaluates the sensor data 10 or camera images 11 and recognizes the artefacts and/or errors and/or interference signals, for example periodic signal or brightness fluctuations or overexposures, etc. By way of example, pattern recognition methods and/or artificial intelligence methods may be used for the recognition, such as for example machine learning methods trained to recognize the artefacts and/or errors and/or interference signals (for example a trained deep neural network).

Figure 3:
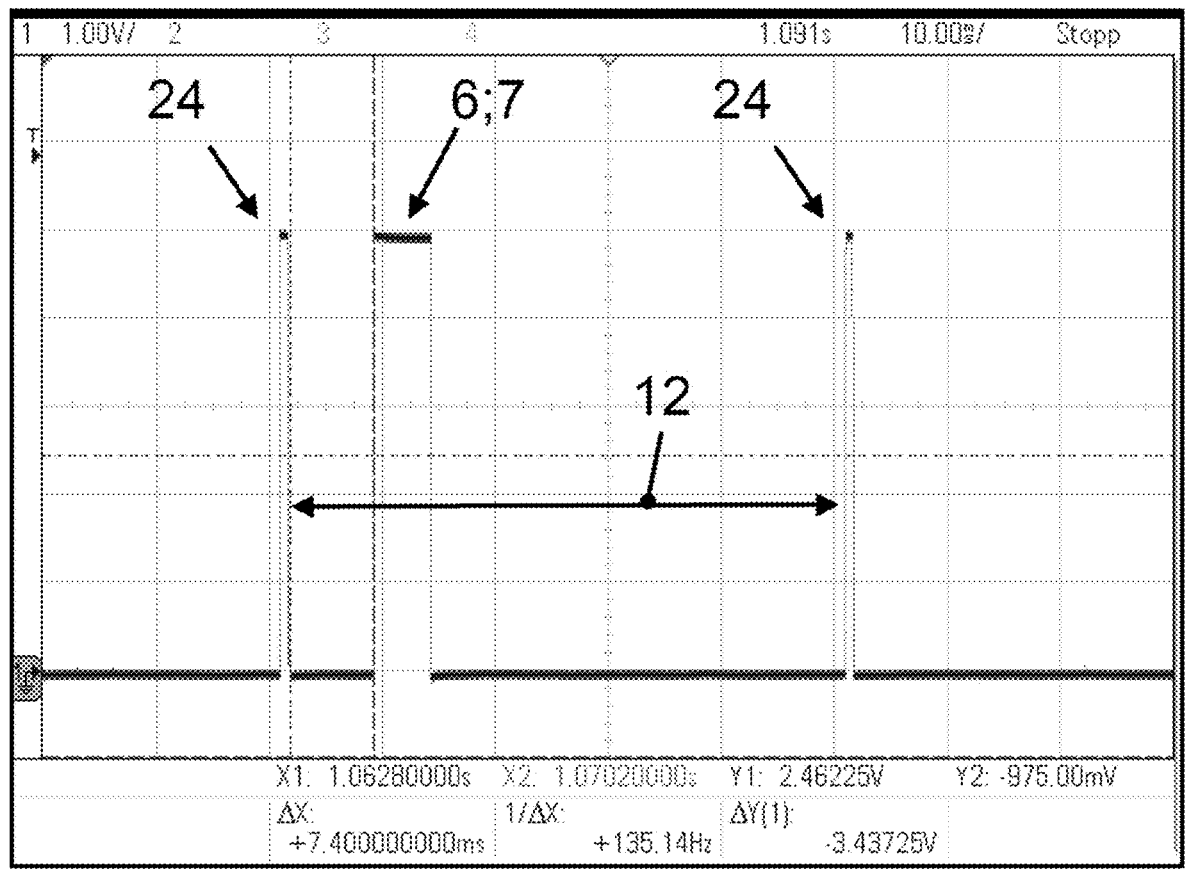
FIG. 3 shows a schematic illustration for elucidating the temporal properties of the extraneous light signals and the light signals after the synchronization in tracking mode.

FIG. 3 shows a schematic illustration for elucidating the temporal properties of the extraneous light signals 24 and the light signals 6 after the synchronization in tracking mode based on a real measurement. The illustration corresponds to a screenshot of an oscilloscope display displaying sensor data (or a brightness signal derived from camera images) that represent light in the near-infrared. Since the extraneous light source of the other medical optical tracking system and the light source of the medical optical tracking system both operate in the same wavelength range (in the near-infrared), the light signals are detected by both tracking systems. With reference to the time axis (x-axis), one cell corresponds here to 10 milliseconds. FIG. 3 shows the extraneous light signals 24 in the form of rectangular pulses having a pulse width of around 1 millisecond with a repetition rate of 50 ms, that is to say a repetition frequency of 20 Hz. In the pulse pause 12, arranged with a time delay (delay time) behind the extraneous light signal 24 of 10 milliseconds, it is possible to see the light signal 6 in the form of a rectangular light pulse 7 with a pulse width of around 5 milliseconds and a repetition frequency of 10 Hz. The measuring window is selected accordingly. The repetition rates and/or the pulse widths may in principle also be selected differently.

LIST OF REFERENCE SIGNS

1 Medical optical tracking system
2 Sensor
3 Camera
4 Light source
5 Control device
6 Light signal
7 Light pulse
8 Measuring window (tracking system)
9 Measuring window (other tracking system)
10 Acquired sensor data
11 Acquired camera image(s)
12 (Extraneous) light signal pause
15 Display device
20 Other medical optical tracking system
21 Camera
22 Light source
23 Control device
24 Extraneous light signal
25 Extraneous light pulse
30 Signal
31 Message
t Time
dt1 Delay time (light signal)
dt2 Delay time (measuring window)

The invention claimed is:

1. A method for operating a medical optical tracking system, the method comprising:
synchronizing the medical optical tracking system with at least one other optical tracking system,
detecting extraneous light signals of the at least one other optical tracking system by a sensor used for tracking or a camera used for tracking of the optical tracking system,
determining temporal properties of the detected extraneous light signals based on acquired sensor data or acquired camera images, and
defining temporal properties of light signals generated by way of a light source of the optical tracking system and/or a measuring window of the sensor or the camera based on the determined temporal properties of the extraneous light signals, such that the light signals from the light source and/or the measuring window lie in light signal pauses of the at least one other optical tracking system.

2. The method according to claim 1, wherein the temporal properties of the generated light signals and/or the measuring window are defined such that the light signals and/or the measuring window are arranged in the light signal pauses a respectively predefined delay time after the respective extraneous light signals.

3. The method according to claim 1, wherein the synchronization is repeated after a predefined duration has elapsed.

4. The method according to claim 1, wherein the synchronization is repeated at regular intervals.

5. The method according to claim 1, the method further comprising determining a signal form and/or a frequency and/or a phase position and/or a start time and/or a duration of the extraneous light signals of the at least one other optical tracking system to determine the temporal properties of the extraneous light signals.

6. The method according to claim 1, the method further comprising deactivating the light source during the synchronization, at least during the detection of the extraneous light signals.

7. The method according to claim 1, the method further comprising selecting a measuring frequency of the sensor or the camera to be greater during the synchronization than in a tracking mode.

8. The method according to claim 1, wherein a first synchronization is performed prior to activation of the light source.

9. The method according to claim 1, the method further comprising generating and outputting a signal and/or a message when no extraneous light signals are detected during the detection and/or when synchronization is not possible.

10. The method according to claim 1, the method further comprising deactivating the light source when synchronization is not possible.

11. The method according to claim 1, the method further comprising
evaluating sensor data acquired by way of the sensor or camera images acquired by way of the camera in tracking mode, and
recognizing artifacts and/or errors and/or interference signals caused by extraneous light signals of the at least one other optical tracking system; and
initiating the synchronization when artefacts and/or errors and/or interference signals have been recognized.

12. An optical tracking system, comprising:
a sensor or a camera, wherein the sensor or the camera are used for optical tracking,
a light source configured to provide light signals for the optical tracking, and
a control device,
wherein the control device is configured to:
perform synchronization with at least one other optical tracking system,
obtain sensor data acquired by way of the sensor or camera images acquired by way of the camera, which comprise detected extraneous light signals of the at least one other optical tracking system,
determine temporal properties of the detected extraneous light signals based on the obtained sensor data or the obtained camera images, and
define temporal properties of the light signals generated by way of the light source and/or a measuring window of the sensor or the camera, on the basis of the determined temporal properties of the extraneous light signals, such that the light signals from the light source and/or the measuring window lie in light signal pauses of the at least one other optical tracking system.

* * * * *